May 6, 1930.  J. D. DAVIS  1,757,654
PEANUT DIGGER
Filed Nov. 3, 1927   3 Sheets-Sheet 2
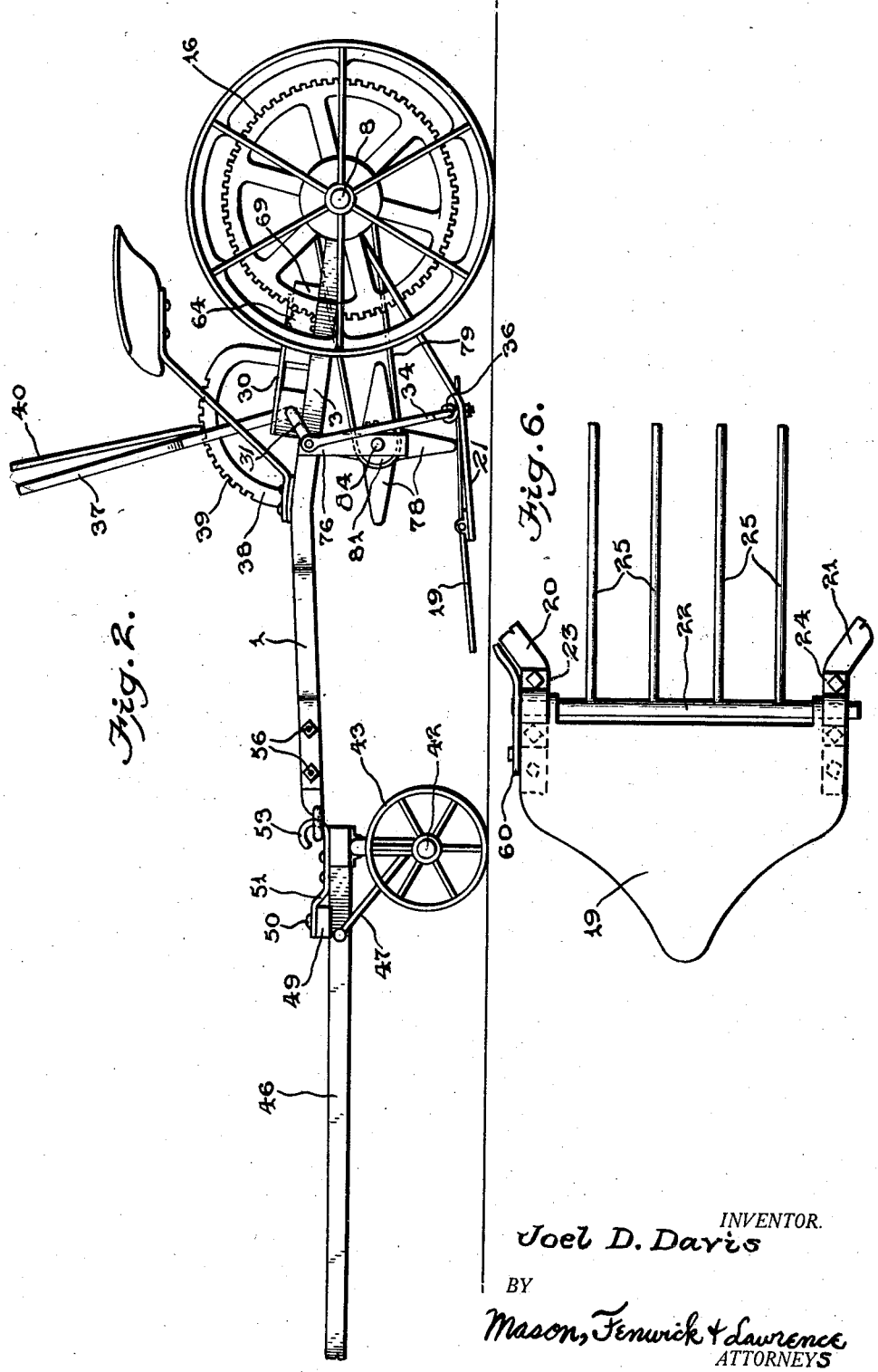
INVENTOR.
Joel D. Davis
BY
Mason, Fenwick & Lawrence
ATTORNEYS May 6, 1930.　　　　J. D. DAVIS　　　　1,757,654
PEANUT DIGGER
Filed Nov. 3, 1927　　　3 Sheets-Sheet 3
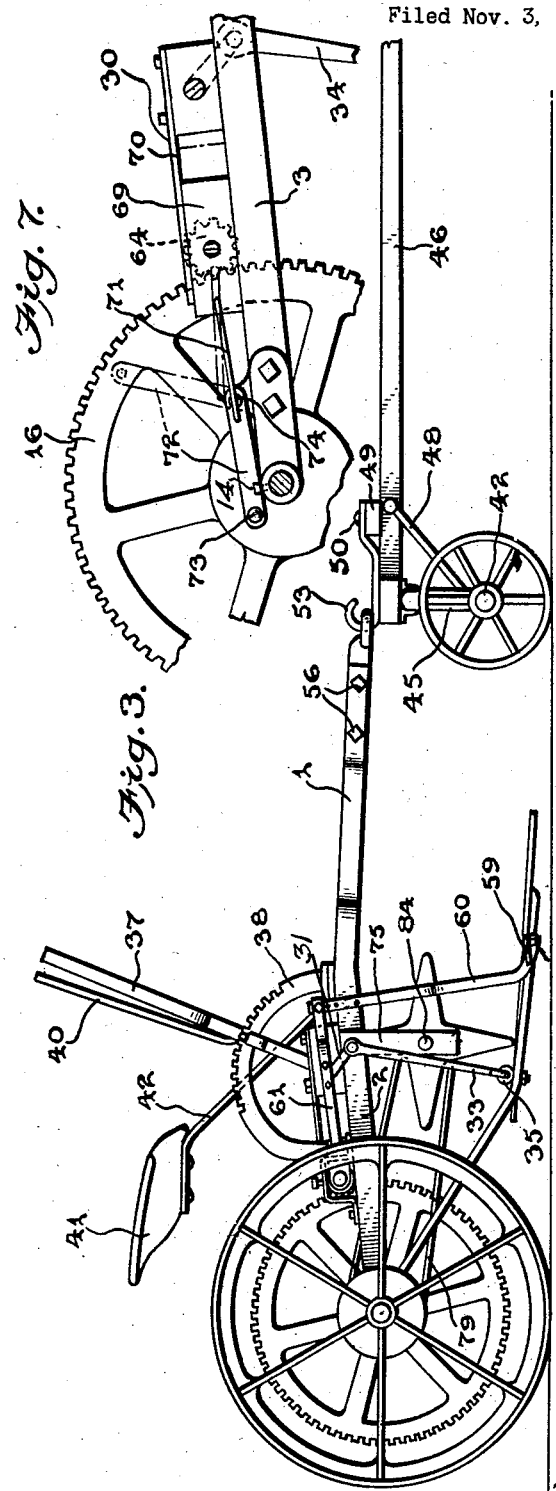
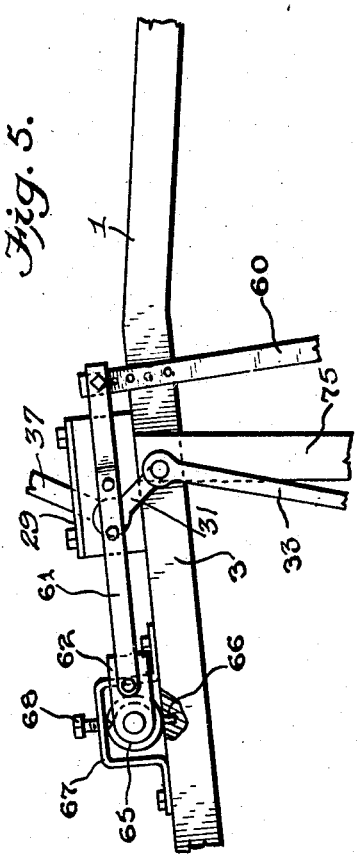
INVENTOR.
Joel D. Davis
BY
Mason, Fenwick & Lawrence
ATTORNEYS Patented May 6, 1930

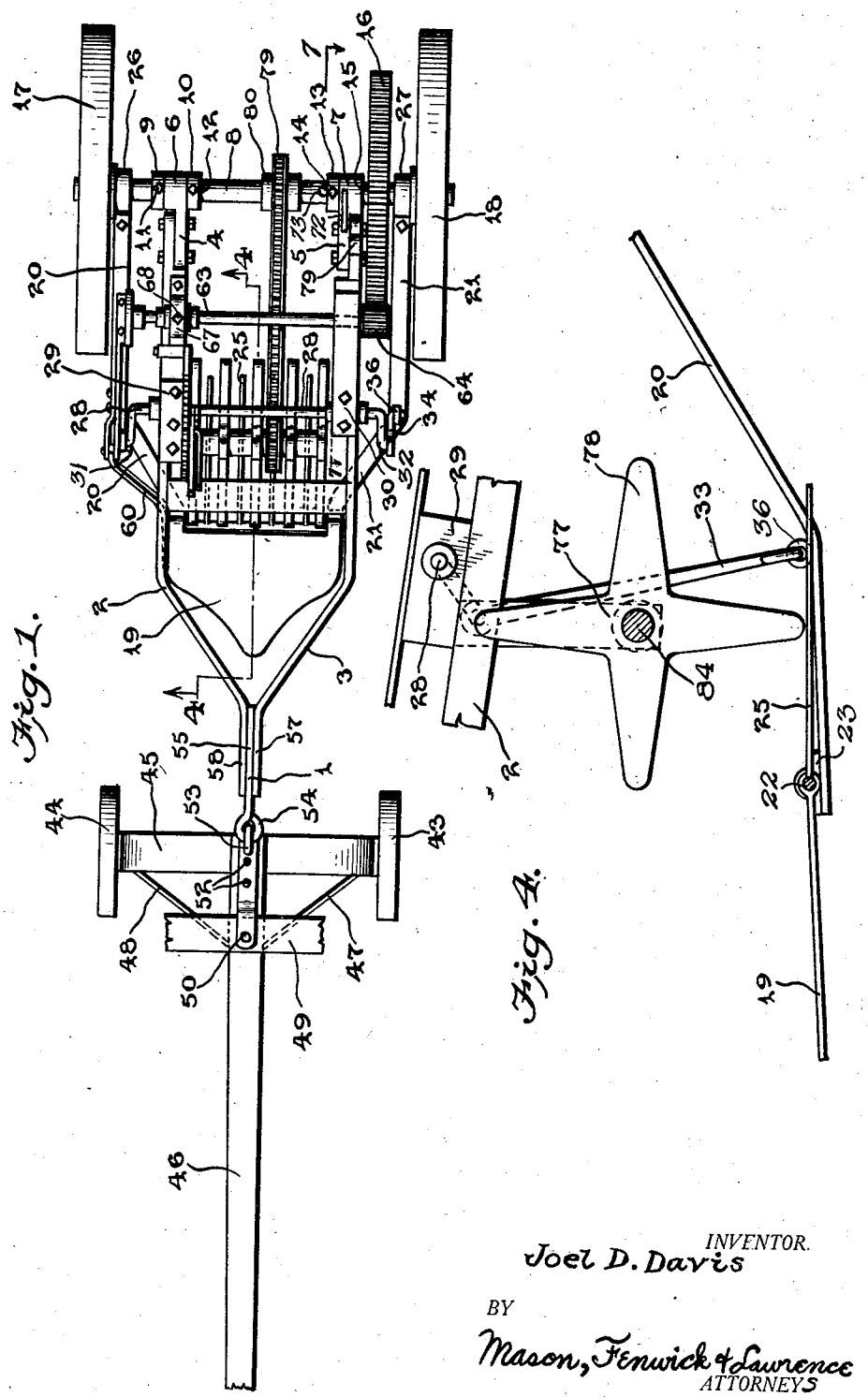

1,757,654

UNITED STATES PATENT OFFICE

JOEL DELSON DAVIS, OF SMITHFIELD, VIRGINIA

PEANUT DIGGER

Application filed November 3, 1927. Serial No. 230,863.

The subject matter of this application is a digger particularly designed for the digging of peanuts, potatoes and similar vegetables.

One object of the invention is to provide a digger which can be easily and cheaply manufactured.

Another object of the invention is to provide a digger of this type which will eliminate practically all manual operations involved in the separation of the vegetables, such as peanuts, from the soil containing them.

Other objects of the invention will become apparent as the detailed description proceeds.

In the drawings:—

Figure 1 is a plan view of my digger;

Figure 2 is a side elevation of one side thereof;

Figure 3 is a side elevation of the other side of said digger;

Figure 4 is a fragmentary section on line 4—4 of Figure 1;

Figure 5 is a fragmentary detail on an enlarged scale of a means for shaking the digging plate of the digger;

Figure 6 is a fragmentary plan view of the digging blade with tines extending rearwardly thereof; and Figure 7 is a fragmentary cross section taken on line 7—7 of Figure 1.

The digger comprises a main frame 1 having rearwardly extending branches 2 and 3, bolted or otherwise suitably secured at their rear ends to lugs 4 and 5, extending forwardly from the sleeves 6 and 7, respectively. The sleeve 6 is rotatably mounted on the shaft 8, and is secured in rotatable position on said shaft by means of collars 9 and 10 arranged on said shaft on opposite sides of sleeve 6, and secured to said shaft by means of the set screws, 11 and 12, respectively. Obviously, this construction prevents lateral movement of the branch 2 on shaft 8.

The sleeve 7 is secured rotatably located on shaft 8 by a collar 13, fixed on said shaft against the inner side of branch 3 by means of a set screw 14. The other side of collar 7 contacts with the hub 15 of a large gear 16 which is suitably fixed to shaft 8. Wheels 17 and 18 are secured in any suitable or usual manner to the opposite ends of shafts 8.

The digging or cutting blade 19 is pivoted to the arms 20 and 21 by seating the ends of a rod 22, rigid with blade 19, rotatably in brackets 23 and 24 suitably bolted or otherwise secured to the arms 20 and 21. The rod 22 is provided with tines 25 extending rearwardly between said arms 20 and 21. The rear ends of the arms 20 and 21 are bent to form collars 26 and 27, respectively, which are pivoted on shaft 8, in lateral contact with the wheels 17 and 18, respectively.

In order to raise or lower the blade 19 into or out of digging position, a crank shaft 28 is journaled in bearing blocks 29 and 30 suitably fixed on the branches 2 and 3 of the main frame 1. Crank arms 31 and 32 extend from opposite ends of shaft 28 and are connected pivotally at their ends to the upper ends of rods 33 and 34 having their lower ends pivotally connected in turn to eye bolts 35 and 36, respectively, secured to the arms 20 and 21.

The crank shaft 28 is rotated in either direction in the usual manner by a lever 37 fixed rigidly to said shaft, and rotatable over a sector 38 having teeth 39 adapted to be engaged by the usual spring controlled lever 40 to lock the lever 37 and crank shaft 28 in any desired position of adjustment. A seat 41 is conveniently secured to frame 1 with the lever 37 arranged to be conveniently operated from said seat.

It will be obvious from the drawing that when the lever 37 is moved in one direction or the other, the rods 33 and 34 will raise or lower the arms 20 and 21 and thereby raise or lower the blade 19 out of or into digging position. In order that this adjustability of the digging blade 19 may be made available, it is obviously necessary to have the front end of the frame 1 supported at a fixed distance above the ground. For this purpose, then, the invention includes a draw bar shaft 42 (See Figure 3) having wheels 43 and 44 suitably rotatably secured to opposite ends thereof. An inverted U-shaped bracket 45 extends vertically up from said shaft 42, and has fixed to the center thereof a draw bar 46, which is braced to said bracket by the braces 47 and 48.

An equalizer bar 49 is pivoted in the usual manner on bar 46 by means of a bolt 50 extending through suitable alined apertures in a strap 51 and in bars 46 and 49. The strap 51 is offset at one end to extend over bar 49, is secured to bar 46 by bolts 52, and terminates at its other end in a hook 53 adapted to receive the eye 54 formed on the free end of a plate 55 which is secured by bolts 56 between the ends 57 and 58 of the frame branches 2 and 3.

The invention also includes means for agitating the digging blade 19 and the tines 25 to break up the dirt, and separate it from the matter being harvested, during the operation of the machine. To effect this agitation one end of the rod 22 and cutter blade 19 has suitably fixed thereto at 59 the lower end of a rod 60, which forms a crank arm for slightly rotating rod 22 as a crank shaft to agitate blade 19 and tines 25.

The upper end of rod 60 is pivoted to one end of a link 61 which has its other end eccentrically pivoted to the arm 62 fixed at the end of a counter shaft 63, and rotated by a pinion 64 movable into and out of mesh with the gear 16.

The shaft 63 is journaled near one of its ends in a bearing 65 (see Figures 1 and 5) which is pivoted on frame branch 2 to permit the shaft 63 to swing about the pivot 66 and throw the pinion 64 into or out of mesh with gear 16 whenever desired. A strap 67 is bolted to branch 2 over the bearing 65 and has a conical pointed set screw 68 screwed through said strap into engagement with a conical recess in the bearing 65 to form a second pivot for said bearing in diametrical alinement with the pivot 66.

The other bearing 69 (see Figure 7) for the shaft 63 is slidably mounted on the branch 3 of frame 1, with sufficient play to allow shaft 63 to swing about pivot 66 without binding. A plate 70 secured to the top of bearing 30 extends rearwardly and parallel with branch 3 over the bearing 69 to form, with branch 3, a guideway for bearing 69.

A link 71 is pivoted at one of its ends to the bearing 69 and has its other end pivoted to a rod 72 provided with a handle 73. The rod 72 is pivoted at its end to a lug 74 formed on the arm 5, and the end of link 71 is pivoted to said rod 72 between its pivot and the handle 73. When the rod 72 is positioned as shown in Figure 7, the link 71 holds the bearing 69 with the pinion 64 in mesh with gear 16. When the rod 72 is raised to the position shown by dotted lines, the link is thrown forwardly and moves the bearing 69 with pinion 64 out of mesh with gear 16, and the eccentric pivotal connection of link 71 with rod 72 causes the bearing 69 to remain in either of its extreme positions without the necessity of locking it therein.

In order to dislodge the dug-up soil and material from the tines 25, the machine is provided with a counter shaft 84 having its opposite ends journaled in straps 75 and 76 suspended from the frame members 2 and 3, respectively. Spaced apart on the shaft 84 and rigidly secured thereto, are a plurality of star-shaped knockers 77, with one knocker arranged so that its arms 78 swing between adjacent tines 25. An endless sprocket chain 79 meshes with sprocket wheels 80 and 81 suitably secured to shafts 8 and 84, respectively, transmits rotation of the shaft 8 to the shaft 84 and rotates the knockers 77 constantly while the machine is in operation.

As will be apparent from the description so far, the digger blade with its tines 25 may be lowered or raised to or from operative position by movement of lever 37, and that while it is in such position, rotation of the wheels 17 and 18 causes, through the gearing described, rotation of the knockers 78 to dislodge material from the tines 25. At the same time rotation of the shaft 63 imparts an oscillatory movement to the crank rod 60, which, in turn, causes an oscillatory movement of the blade 19 and tines 25 about their pivotal connection with the members 20 and 21.

I claim:

A digger comprising a shaft and a pair of wheels secured to opposite ends of the shaft, a frame having one end journaled on said shaft, a wheeled support detachably and pivotally connected to the other end of said frame, a second frame having one end pivoted to said shaft and having a cutting blade pivoted on the other end thereof, means for raising and lowering the blade supporting end of said second frame relative to the first named frame and means connected to said shaft for oscillating said blade about its pivot axis on said second frame.

In testimony whereof I affix my signature.

JOEL DELSON DAVIS.